(12) United States Patent
Moler et al.

(10) Patent No.: US 7,132,781 B2
(45) Date of Patent: Nov. 7, 2006

(54) TEMPERATURE COMPENSATING INSERT FOR A MECHANICALLY LEVERAGED SMART MATERIAL ACTUATOR

(75) Inventors: Jeff Moler, Sarasota, FL (US); John A. Bugel, Largo, FL (US); Mark Oudshoorn, Parrish, FL (US)

(73) Assignee: Viking Technologies, L.C., Sarasota, FL (US)

( * ) Notice: Subject to any disclaimer, the term of this patent is extended or adjusted under 35 U.S.C. 154(b) by 109 days.

(21) Appl. No.: 10/613,138

(22) Filed: Jul. 3, 2003

(65) Prior Publication Data

US 2004/0035106 A1    Feb. 26, 2004

Related U.S. Application Data

(60) Provisional application No. 60/393,799, filed on Jul. 3, 2002.

(51) Int. Cl.
*H01L 41/08* (2006.01)
(52) U.S. Cl. ...................................... 310/328
(58) Field of Classification Search ........ 310/326–328, 310/330–335; H01L 41/08; H02N 2/00
See application file for complete search history.

(56) References Cited

U.S. PATENT DOCUMENTS

| | | | |
|---|---|---|---|
| 4,284,263 A | 8/1981 | Newcomb | |
| 4,431,873 A | 2/1984 | Dunn et al. | |
| 4,570,095 A | 2/1986 | Uchikawa | |
| 4,622,484 A | 11/1986 | Okihara et al. | |
| 4,633,118 A | 12/1986 | Kosugi | |
| 4,703,215 A | 10/1987 | Asano | |
| 4,736,131 A | 4/1988 | Fujimoto | |
| 4,783,610 A | 11/1988 | Asano | |
| 4,808,874 A | * 2/1989 | Stahlhuth | 310/328 |
| 4,907,748 A | 3/1990 | Gardner et al. | |
| 4,937,489 A | 6/1990 | Hattori et al. | |
| 4,979,275 A | 12/1990 | Sakaida et al. | |
| 5,004,946 A | 4/1991 | Sakaida et al. | |

(Continued)

FOREIGN PATENT DOCUMENTS

DE        19523229 A1    1/1997

(Continued)

OTHER PUBLICATIONS

Salim R et al: "Kleinste Objekte Im Griff a Grip on Even the Smallest Objects" F&M Feinwerktechnic Mikrotechnic Mikroelektronik, Carl Hanswer GMBH & Co, DE, vol. 104, No. 9, Sep. 1, 1996, pp. 637-640, XP000636588.

(Continued)

*Primary Examiner*—Tran Nguyen
*Assistant Examiner*—Karen Addison
(74) *Attorney, Agent, or Firm*—Young & Basile, P.C.

(57) ABSTRACT

An apparatus having a smart material actuator, a support structure and at least one temperature compensating material insert, either externally mounted to the support structure, integrally formed with the support structure, or any combination thereof. The apparatus includes a mechanically leveraged electrically stimulated smart material. The support structure and actuator are susceptible to the effects of differences in thermal coefficients of expansion of the materials used in the construction. The smart material typically displaces less than 0.001 inches and is leveraged up to fifty times to obtain useful movement. The temperature effect on the smart material is therefore leveraged and amplified producing undesirable motion in the apparatus with ambient and/or operating temperature changes. A method for dimensioning and placement of a compensating insert with respect to the support structure provides an accurate and cost effective compensating insert.

20 Claims, 8 Drawing Sheets

U.S. PATENT DOCUMENTS

| | | | |
|---|---|---|---|
| 5,059,850 A | 10/1991 | Yoshimura et al. | |
| 5,111,101 A | 5/1992 | Imoto | |
| 5,323,948 A | 6/1994 | Yamazaki et al. | |
| 5,333,455 A * | 8/1994 | Yoshioka | 60/533 |
| 5,388,751 A | 2/1995 | Harada et al. | |
| 5,465,021 A | 11/1995 | Visscher et al. | |
| 5,746,422 A | 5/1998 | Harada et al. | |
| 5,810,255 A | 9/1998 | Itoh et al. | |
| 5,907,211 A | 5/1999 | Hall et al. | |
| 6,291,928 B1 | 9/2001 | Lazarus et al. | |
| 6,294,859 B1 | 9/2001 | Jaenker | |
| 6,313,568 B1 | 11/2001 | Sullivan et al. | |
| 6,376,969 B1 | 4/2002 | Forck | |
| 6,762,536 B1 * | 7/2004 | Hoffmann et al. | 310/332 |
| 2004/0125472 A1 | 7/2004 | U.S. | |

FOREIGN PATENT DOCUMENTS

| | | | |
|---|---|---|---|
| EP | 0325764 | | 8/1989 |
| JP | 60180036 | | 9/1985 |
| JP | 6129681 | | 12/1988 |
| JP | 1-85175 | * | 7/1989 |
| JP | 01185175 | | 7/1989 |
| JP | 1217982 | | 8/1989 |
| JP | 2218579 | | 8/1990 |
| JP | 402218579 A | | 8/1990 |
| JP | 10248278 | | 9/1998 |
| WO | 2001/0030306 A1 | | 10/2001 |
| WO | WO 0178160 | | 10/2001 |
| WO | WO0179731 A | | 10/2001 |

OTHER PUBLICATIONS

Xu Wei, King Tim: "Flexure Hinges for Piezoactuator Displacement Amplifiers: Flexibility, Accuracy, and Stress Considerations" Precision Engineering, vol. 19, No. 1, Jul. 1996, pp. 4-10, XP002256802.

* cited by examiner

TEMPERATURE COMPENSATING INSERT FOR A MECHANICALLY LEVERAGED SMART MATERIAL ACTUATOR

CROSS-REFERENCE TO RELATED APPLICATIONS

This application is a continuation of provisional patent application No. 60/393,799 filed on Jul. 3, 2002, which is incorporated by reference herein.

FIELD OF THE INVENTION

The present invention relates to a temperature compensating apparatus for a mechanically leveraged smart material actuator and method for the same.

BACKGROUND OF THE INVENTION

Various smart material actuator technologies have been developed for a wide range of applications in different industries. One component used in this type of actuator is an electrically stimulated smart material actuator. These smart material actuators when electrically stimulated change shape. This shape change can be designed such that one axis predominantly changes. Such a smart material actuator can be incorporated within a main support structure. As the axis of the smart material actuator changes dimension its motion is magnified by a lever integral to the main support structure. As a result of the magnification factor developed by the main support structure, extremely small differences of thermal coefficients of expansion between the smart material and main support structure can create relatively large movements of output in the main support structure over normal operating temperature ranges. This movement can be as much as fifty percent of the usable output of the actuator system.

Previous designs place the compensating element in line with the smart material. This method suffers from several problems. One such problem is the length of the compensating element inserted between the main body and the smart material increases the overall length of the actuator. Further smart materials are capable of delivering large amounts of force, so the compensating element must be sufficiently stiff to prevent a reduction of the force and movement performance of the actuator while acting as the inline compensating element. This is a difficult combination to achieve with inexpensive materials.

Another common design is to place sleeves with different coefficients of thermal expansion around the smart material causing the cavity that captures the smart material to expand and contract with temperature. This system uses several parts, all of which are complex, and costly to machine and increases the overall size making it less desirable.

SUMMARY OF THE INVENTION

An apparatus according to the present invention includes a support structure with first and second arms spaced apart from one another. A smart material actuator, such as a piezoelectric actuator, moves the first and second arms with respect to one another in response to expansion and contraction of the actuator. Means for compensating for the effects of different thermal coefficients of expansion of the materials used in the support structure and actuator is provided to reduce or eliminate movement of the arms resulting from variations in working temperature and/or ambient temperature.

The present invention provides a simple, cost effective solution for compensating a mechanically leveraged actuator for temperature variations. The present invention provides means for compensating for the effects of different thermal coefficients of expansion while not increasing the envelope of the actuator system, and can correct the overall zero voltage error to no greater than ± seven percent of the maximum movement of the actuator system. As a result of the scalability of the actuator system, a process for the development of all parameters has been developed that reduces the time to design a particular physical configuration of an actuator/support structure combination for use in a specific application. The present invention uses a design system, a smart material actuator, a support structure with integral mechanically leveraged arm portions, and a temperature compensating insert element. The temperature compensating insert element is placed at a predetermined position on the support structure spaced from the actuator, such as along an arm portion. This insert element can be inserted into a cutout in the arm portion. By using two different materials for the insert and the arm portion, a bi-material or bi-metal type of movement cantilevering the arm portion can be created. Therefore, with the use of the design system, the placement, and material type of the temperature compensating insert element become readily apparent using a minimum number of components while maintaining an error band of less then 5 percent of travel.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
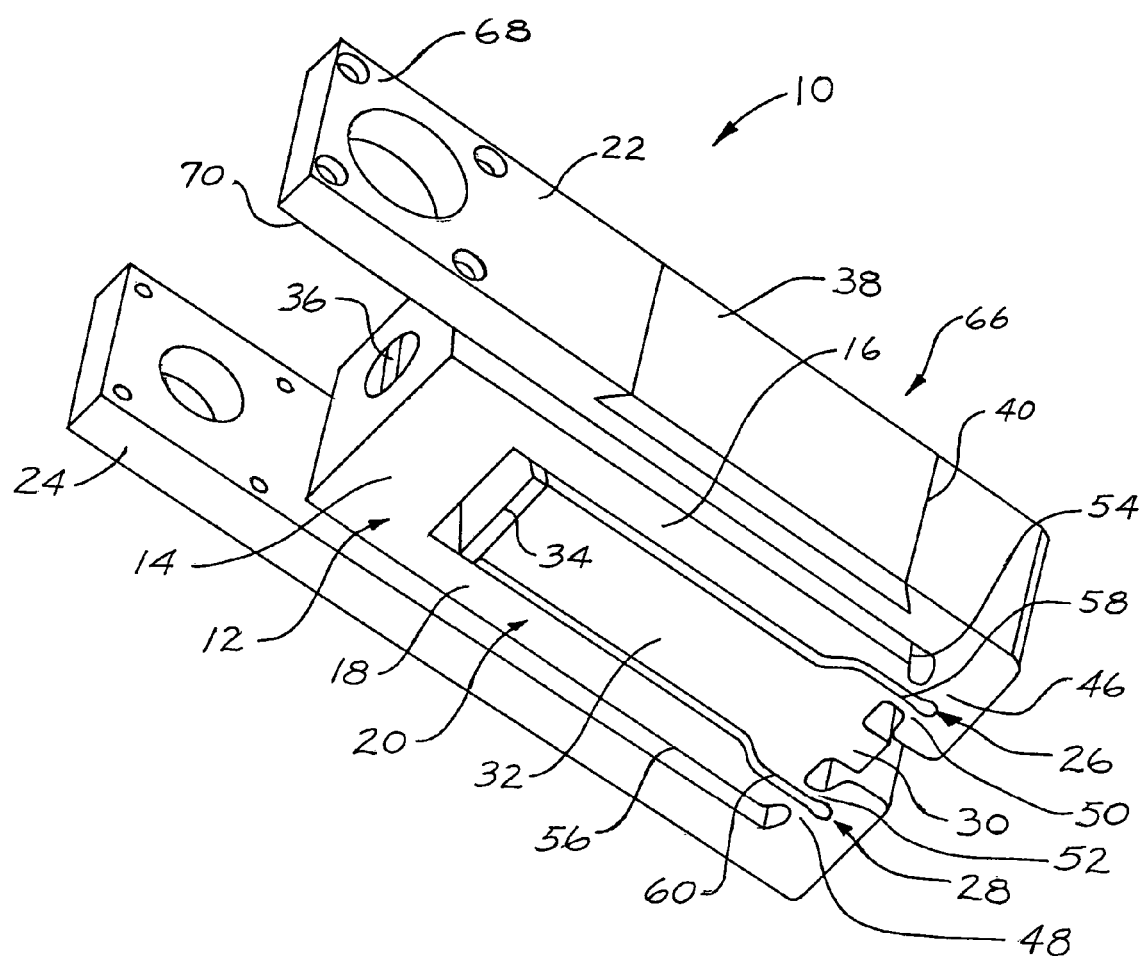
FIG. 1 is a perspective view of an electromechanical actuator according to the present invention.

Referring now to FIG. 1, a perspective view of one embodiment of an apparatus 10 is illustrated having a support structure 12 including a non-flexing web portion 14 extending between an upper and a lower pair of rigid non-flexing side portions 16, 18 forming a C-shaped portion 20. At least one pivotable arm portion, such as a first arm portion, 22, or 24 is pivotably connected via a corresponding living integral hinge portion 26, or 28 to a corresponding side portion 16, or 18. Another pivotable arm, such as a second arm portion 24 can be optionally connected via a corresponding living integral hinge portion 28 to the other rigid side portion 18, if two opposing arms 22, 24 are desired. A force transfer member 30 includes a surface engagable with one end of a smart material actuator 32. The opposite end of the smart material actuator 32 engages with an adjustable seat 34. Adjustable seat 34 can be supported by an adjustable support screw 36, connected through the support structure 12. A compensating insert 38 is inserted in at least one pivotable arm portion 22, 24. The compensating insert 38 can be the same width as the corresponding pivotable arm portion 22, 24 and can be inserted to completely fill a cutout portion 40 of the support structure 12.

Figure 2:
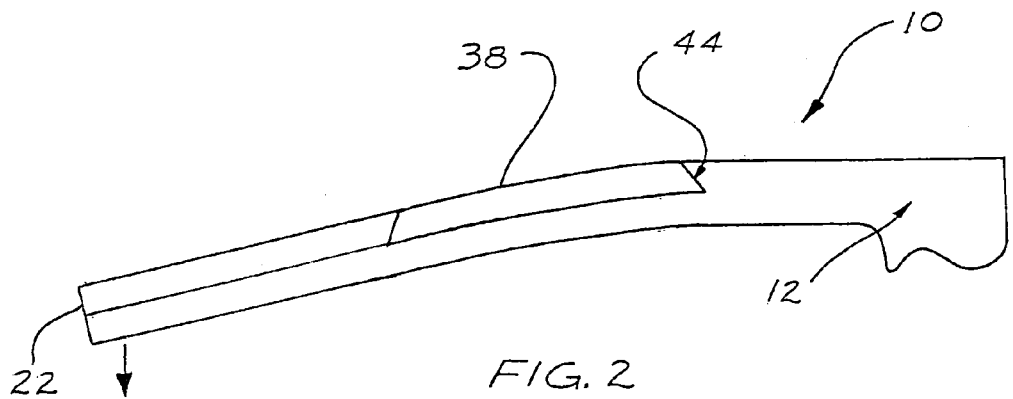
FIG. 2 is an exaggerated side view of FIG. 1 cut away to show the action of the compensating element according to the present invention.

Referring now to FIG. 2, an exaggerated side view of the action of the compensating element 38 of the apparatus 10 shown in FIG. 1 is illustrated. By way of example and not limitation, the pivotable arm 22 can be made from a 416 stainless steel with a coefficient of thermal expansion of $5.7 \times 10^{-6}$ in/in ° F., and the compensating insert 38 can be made from a 304 stainless steel alloy with a coefficient of thermal expansion of $9.6 \times 10^{-6}$ in/in ° F., When two metal strips having different coefficients of expansion are joined together, a change in temperature will cause free deflection of the assembly. In this case the insert 38 expands more than the pivotable arm 22 causing a free deflection in the direction shown. It should be noted that the insert 38 could be placed in a position located 180 degrees from the illustrated location, or in other words at the bottom of the pivotal arm 22 causing an upward deflection, also the insert 38 could be a material with a smaller coefficient of thermal expansion changing the direction of free deflection. This deflection is used to counter the difference in the thermal coefficients of expansion between the smart material actuator 32 and the support structure 12 as the temperature changes. Alternatively, other materials can be employed for the support structure 12 such as 17-4PH stainless steel having a coefficient of thermal expansion of $6 \times 10^{-6}$ in/in ° F. and a high expansion metal alloy (nickel-chromium-iron) 22-3 having a coefficient of thermal expansion of $10.55 \times 10^{-6}$ in/in ° F. In general, suitable materials for use in the support structure can be selected based on the materials ability to form a highly rigid structure. Such a rigid structure will help minimize undesirable motion and thereby enable maximum motion of the arms. Based on this criteria, the support structure could be formed using a range of materials such as steel or other metals, alloys, ceramics, composite materials, or any combination thereof Composite materials by way of example and not limitation, can include a metal material blended with a nonmetallic material, or two different metal materials blended together, or two different nonmetallic materials blended together, or any combination thereof In general, the thermal compensating element employed in conjunction with the support structure should not reduce arm stiffness compared to a thermally uncompensated arm. Loss of arm stiffness can reduce the output performance of the arms of the support structure. Based on this criteria, the support structure could be formed using a range of materials such as steel or other metals, alloys, ceramics, composite materials, or any combination thereof. Composite materials by way of example and not limitation, can include a metal material blended with a nonmetallic material, or two different metal materials blended together, or two different nonmetallic materials blended together, or any combination thereof. Any loss in output performance of the arms due to thermal compensation must be balanced against the full spectrum of application requirements such as size, weight, reliability, repeatability, etc.

Figure 3:
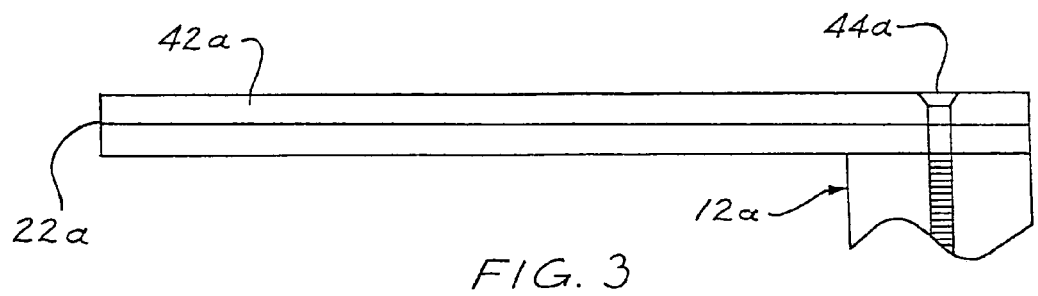
FIG. 3 is a view of an alternate construction of the present invention.

Referring now to FIG. 3, the pivotable arm 22a can be composed of a bi-material strip 42a fastened to the support structure 12a with fasteners 44a. In this example, the bi-material strip 42a provides for a free deflection for temperature change in an approximately equal and opposite reaction to the net sum of the thermal expansions of the support structure 12a, and smart material actuator (not shown). It can be recognized by those skilled in the art that fasteners 44a are not the only method of attaching the pivotable arm 22a to the support structure. By way of example and not limitation, other means can include: welding, brazing, soldering, chemical bonding, etc, or any combination thereof.

Figure 4:
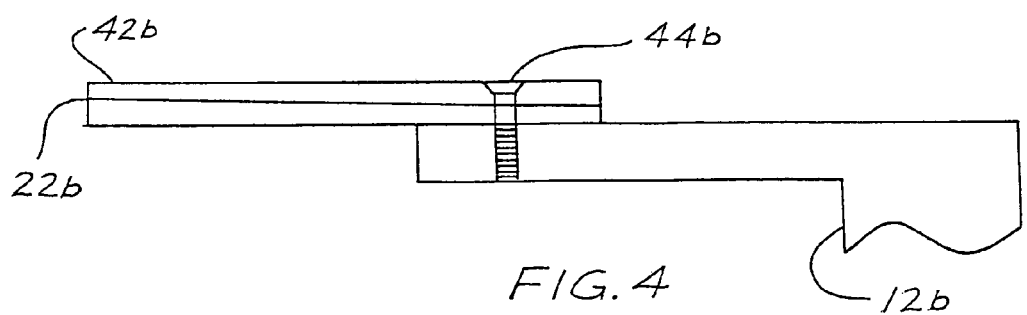
FIG. 4 is a view of an alternate construction of the present invention.

Referring now to FIG. 4, a portion of the pivotable arm 22b can be composed of a bi-material strip 42b fastened to the pivotable arm 22b with fasteners 44b. In this example the bimetallic and/or bi-material strip 42b can be positioned along the pivotable arm such that the bimetallic and/or bi-material strip 42b provides for a free deflection for temperature change in an approximately equal and opposite reaction to the sum of the thermal expansions of the support structure 12b, pivotable arm portion 22b, and smart material actuator (not shown). It should be recognized by those skilled in the art that fasteners 44a are not the only method of attaching the pivotable arm 22a to the support structure. By way of example and not limitation, other means can include: welding, brazing, soldering, chemical bonding, etc, or any combination thereof.

Figure 5:
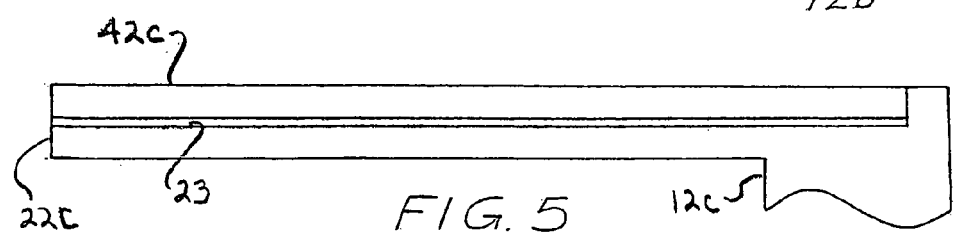
FIG. 5 is a view of an alternate construction of the present invention.

Referring now to FIG. 5, a portion of the pivotable arm 22c can be composed of a bi-material and/or bimetallic strip 42c fastened to the pivotable arm 22c with a suitable attachment layer of material 23. The attachment layer of material can be any suitable adhesive, solder, welding/brazing rod residue or the like, or any combination thereof The strip 42c is fixedly connected to the arm 22c within the notch or slot formed therein to provide for a free deflection in response to temperature changes in an approximately equal and opposite reaction to the sum of the thermal expansions of the support structure 12c, pivotable arm 22c, and smart material actuator (not shown).

Figure 10:
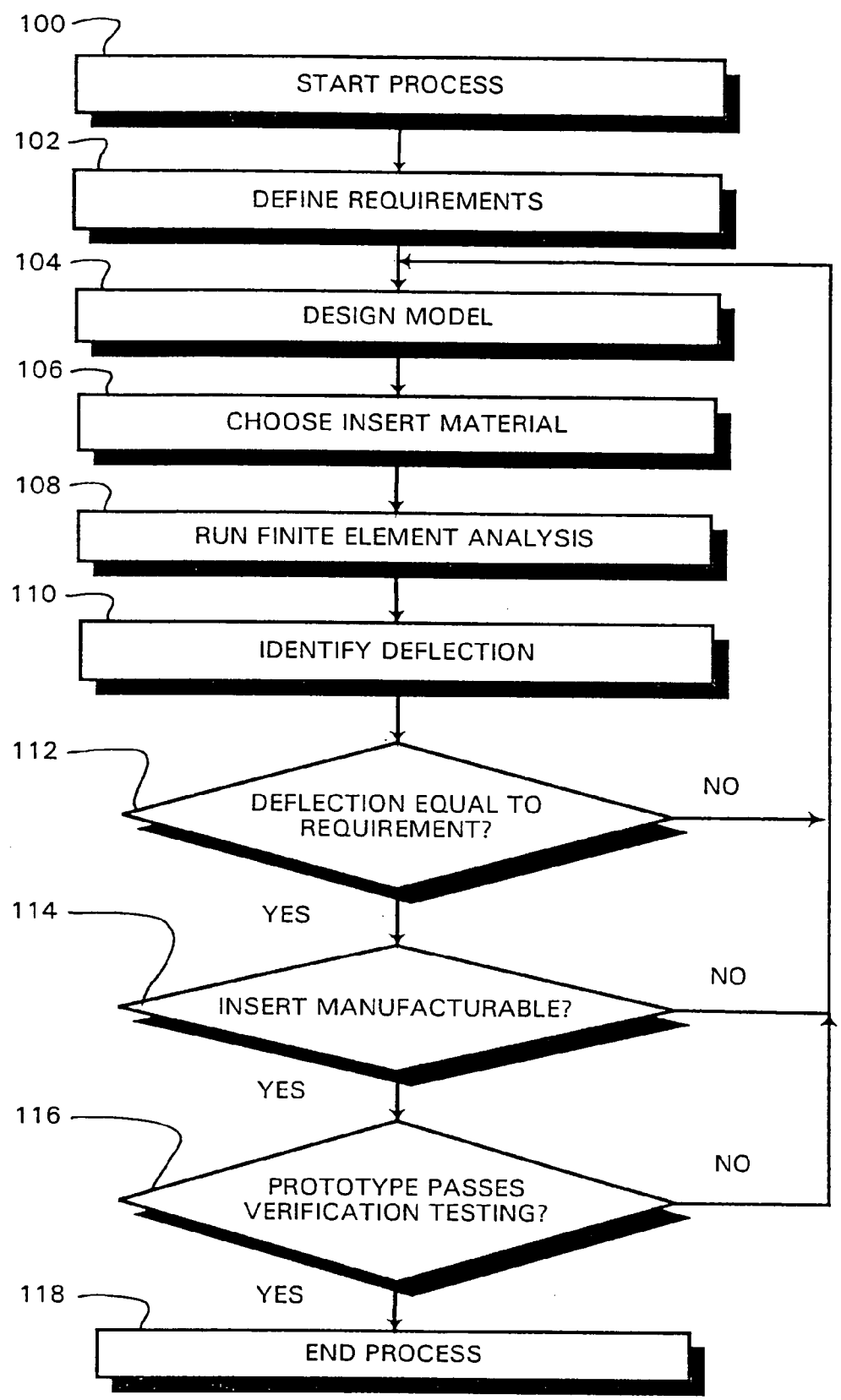
FIG. 10 is a simplified flowchart illustrating the steps of a method used in designing and placement of the temperature compensating element according to the present invention.

Referring now to FIG. 10, a simplified flowchart illustrates the optimization of the material, orientation and dimensions of the compensation insert according to the present invention. Beginning at step 100, the requirements of the application are defined. The requirements can be a selection of parameters, by way example and not limitation, including the parameters of force, size, positioning, vibration, stress, impact resistance, cycle life, operating frequency, temperature, environmental resistance, corrosion resistance, production cost, hysteresis, linearity, galvanic reaction, and/or repeatability. After the requirements are defined in step 102, the process continues to step 104 where a three dimensional (3D) computer aided design (CAD) model is developed initially. An insert material is then chosen in step 106 and inserted in the 3D CAD model. Finite element stress analysis (FEA) is then conducted in step 108 to predict the performance of the compensating insert. As a result of the finite element stress analysis, the deflection of the arm is determined in step 110. The requirement is then checked in step 112 against the calculated deflection identified in step 110. If it is determined not to meet the requirements previously defined in step 102, the process branches back to step 104, where the model is further optimized and continues the loop until the requirements are satisfied. If the requirement in step 112 meets the requirements in step 102, the process continues to step 114, where the configuration is evaluated for, by way of example and not limitation, various characteristics including cost, manufacturability, component count, material type, and/or performance repeatability. If it is determined that the particular 3D CAD model under consideration does not meet the requirements, the process branches back to step 104, where the model is further optimized and continues the loop until the requirements are satisfied. If the requirement in step 114 meets the requirements in step 102, the process continues to step 116, where the configuration is evaluated by building and testing a prototype to verify the requirements of step 102 are met. If it is determined that the requirements are not met, the process branches back to step 104, where the model is further optimized and continues to loop until the prototype satisfies the requirements. If it is determined that the requirements are met, the process terminates with step 118, and the design is complete.

In the embodiment illustrated in FIG. 1, these components can be machined from two different types of material. By way of example and not limitation, the support structure 12 can be made from stainless steel and the compensating insert 38 can be made from brass.

The apparatus 10 shown in FIG. 1 has a support structure 12 with a first pivotable arm portion 22 and a second pivotable arm portion 24 spaced apart from one another. Each arm portion 22, 24 is connected to a corresponding rigid, non-flexing side portions 16, 18 via integrally formed living hinge portions 26, 28 respectively. Each hinge portion 26, 28 includes a corresponding primary hinge web 46, 48 connected to the corresponding side portions 16, 18, and corresponding secondary hinge webs 50, 52 are connected to the force transfer member portion 30. By way of example and not limitation, slots 54 and 56 can be formed between each arm portion 22, 24 and the side portions 16, 18 to allow the arm portions 22, 24 to move without contacting the side portions 16, 18 of the support structure 12. Slots 58 and 60 can be formed between the primary hinge portions 46, 48 and the force transfer portion member 30 for facilitating mechanical leverage from the force transfer member 30 to the arm portions 22, 24.

A smart material actuator 32, such as a piezoelectric actuator, operates by changing shape proportionally in response to electric power being applied to the material. The actuator 32 pivots the first and second arm portions 22, 24 with respect to one another in response to expansion and contraction of the material. The actuator 32 can be located between an adjustment seat 34 and the force transfer member portion 30. It should be recognized that a piezoelectric actuator is one possible type of smart material actuator, and other devices such as magnetostrictive or electrostrictive material actuators are also contemplated to be within the scope of the present invention.

The force transfer member portion 30 and the pivotable arm portions 22, 24 are designed to be substantially rigid component portions. Any flexure of these elements, even microscopic, results in inefficient work transfer due to undesirable motion. In general, the motion of a piezoelectric actuator stack is microscopic, generally approximately 0.1% of the length of the stack. Based on the length of stacks contemplated for the present invention, such motion would be on the order of 1500 micro inches to 100 micro inches maximum displacement depending on the actual embodiment. Therefore, all of the components of the support structure 12 are typically designed to minimize undesirable motion. In extreme, motion greater than 4 micro inches would be considered non-rigid and undesirable with respect to the disclosure of the present invention under expected design loads with infinite life for the support structure 12. In actual practice, rigidity is more effectively defined as a ratio of the displacement distance or motion of the side portions, for example 16, 18, toward and away from one another to the displacement distance during free deflection of the force transfer member 30 (i.e. where free deflection is being defined as operating against no load and performing no work). In this context, a displacement distance or motion of the side portions, 16, 18, in excess of 10% of the displacement distance or free deflection of the force transfer member 30 would be considered non-rigid according to the present invention. In practice, this percent is typically much lower. For example, in an embodiment wherein the piezo stack is approximately 0.394 inches long, the percentage of undesirable side portion motion to free deflection is on the order of 2%. Another indication of structural rigidity and resulting performance efficiency is the ratio of the measured free deflection of the arm portions, for example 22, 24, versus the theoretical or calculated values for such motion (i.e. assuming zero loss of motion through a theoretically rigid structure). The minimum efficiency achieved by the present invention using this definition is approximately 80%. Additionally, efficiency as high as approximately 90% has been achieved according to the present invention. It is expected that efficiencies greater than 90% can be achieved with configurations according to the present invention. For example, the hinge portion geometry is specifically designed for maximum performance without stress fatigue failure. According to the present invention, all portions of the support structure 12 are considered to be "rigid" except for the hinge portions. The hinge portions are the only components or portions of the support structure where flexure, deflection and movement are desirable. The hinge portions are locations of maximum stress in the support structure 12. The flex points of the hinge portion geometry are precisely selected to optimize performance for a particular use. The design process is supportive of this approach, by adapting the amplifier effect of the hinge portions to meet particular specifications. By way of example and not limitation, Finite Element Analysis has demonstrated hinge life should be "infinite" within the context of industrial applications. Lab testing of devices using a piezo stack as the primary actuation method combined with the motion amplifier as taught by the present invention have exceeded 500 million on/off cycle operations. The apparatus 10 can be formed of a homogenous material throughout, such as steel, or any suitable material or composite material known to those skilled in the art, as long as the material selected meets the design criteria discussed above for the particular application.

The support structure 12 includes a first rigid, non-flexing side portion 16, a second rigid, non-flexing side portion 18, and a rigid non-flexing web portion 14. Each side portion 16, 18 is integrally connected with the rigid, non-flexing web 14. The side portions 16, 18 are integrally formed with the hinge portions 26, 28 of the first and second pivotable arm portions 22, 24. The first and second arm portions 22, 24 are rigid, non-flexing structures.

The flex points and hinge geometry are precisely selected to optimize performance for a particular application. The design process is supportive of the approach to adapt the "amplifier" effect of arm portions 22, 24 in combination with the hinge portions 26, 28 to meet the specifications required for a particular application for maximizing performance without inducing material fatigue. The life expectancy verified in lab tests show no measurable change in performance of the apparatus 10 according to the present invention after five hundred million on/off cycles.

Figure 7:
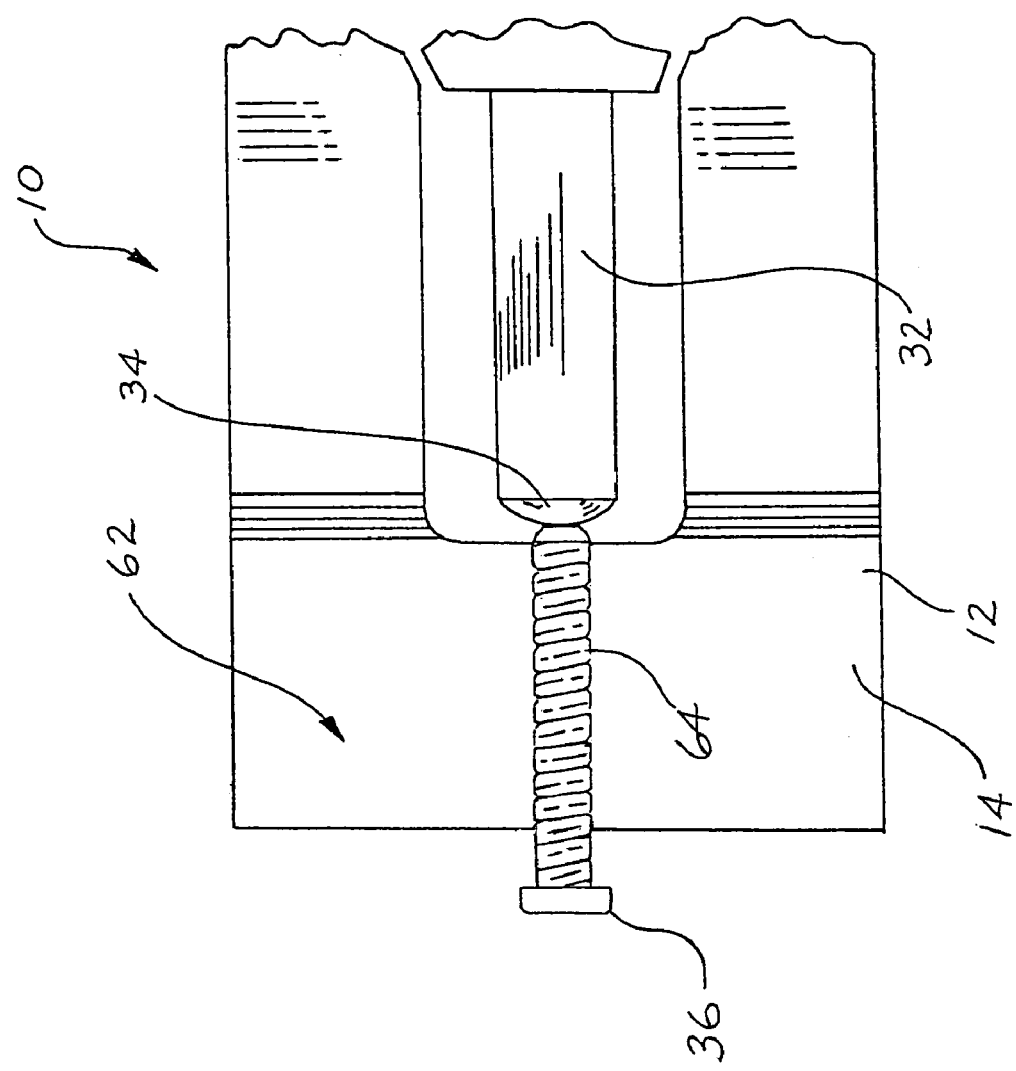
FIG. 7 is a perspective view of an actuator preloading mechanism according to the present invention.

Referring now to FIGS. 1 and 7 the apparatus 10 includes means 62 for preloading a compressive force on the actuator 32. Preloading means 62 can include a screw 36 for threadably engaging with a threaded aperture 64 located in the web portion 14 of the support structure 12. The screw 36 can be capable of imparting a compressive force with respect to the actuator 32 through an adjustment seat 34. The adjustment seat 34 transmits the compressive force from the screw 36 into the actuator 32. The adjustment seat 34 can include a force focusing shim having a substantially curved surface for transmitting the preload force evenly into the actuator as purely compressive load without any shear load.

Means 66 is used for compensating for the effects of different thermal coefficients of expansion of the materials used in the support structure 12 and actuator 32 to reduce or eliminate movement caused by variations in working temperature and/or ambient temperature. Every material has a coefficient of thermal expansion. Materials expand or contract in size as the working temperature and/or ambient temperature surrounding the material changes. The magnitude of the expansion and contraction is proportional to the coefficient of thermal expansion. Temperature compensation according to the present invention can reduce or eliminate the effect of temperature variation on the apparatus 10. The temperature compensating means 66 according to the present invention can include a compensating insert 38 operably engagable with the support structure 12, such as being connectible with at least one arm portion 22 as shown in FIG. 2. A cutout portion 40 of the arm portion 22 can be removed and a compensating insert 38 can be inserted in the cutout portion 40. The insert 38 can be operably connectible to the arm portions 22 in any suitable fashion such as by suitable adhesive bonding, brazing, welding, fastening, etc. or any combination thereof The compensating insert 38 has a different coefficient of thermal expansion (i.e. either lower or higher) relative to the arm portion 22 so that the arm 22 is deflected in an amount substantially equal to and in an opposite direction with respect to any deflection caused by changes in working temperature and/or ambient temperature. The cutout portion 40 can be in an outer surface 68 of arm portion 22 or can be in an inner surface 70 of the arm portion 22. Although temperature compensation according to the present invention involves use of an insert to deflect the arm portions 22, 24 as a result of expansion and/or contraction of the material proportional with the ambient temperature variation, the arm portions 22, 24 are still rigid in the sense that the support structure substantially limits flexing motion under design load conditions. While the present invention has been illustrated and described in detail with respect to a physically separate "insert" with respect to the arm portions 22, 24, the present invention also discloses and encompasses an integral "insert" configuration. It should be recognized by those skilled in the art that the present invention can be formed with the insert integrally embedded internally within a corresponding arm portion 22, 24 and/or can be formed with the arm portion 22, 24 itself being a suitable blending of materials in order to provide the desired characteristics. By way of example and not limitation, the present invention can be made by forming the support structure 12 using composite sintered material molding techniques. Therefore, the use of the generic term "insert" herein is defined to encompass a physically separate "insert" configuration, or an integrally formed "insert" configuration, or any combination of the separate and integral formed configurations.

Referring now to FIG. 3, at least one arm portion 22a can be made from a bimaterial layer 42a forming an entire length of at least one of the arm portions 22a. The arm portion 22a can be fastened to the support structure 12a with a fastener 44a. Alternatively, arm portion 22a may be fastened to the support structure 12a using other suitable means such as brazing, soldering, welding, chemically bonding, or any combination thereof.

Referring now to FIG. 4, a bimaterial layer 42b forms a partial length of the arm portion 22b. A fastener 44b is used to fasten the arm portion 22b having a bimaterial layer 42a to the support structure 12b. Alternatively, arm portion 22b may be fastened to the support structure 12b using other suitable means such as brazing, soldering, welding, chemically bonding, or any combination thereof.

Now referring to FIG. 10, a method is disclosed for designing an apparatus 10 according to the present invention. The steps include the step of defining the design requirements 102, modeling the support structure 12, insert 38 in arm 22 and actuator 32 of the apparatus 10 with 3D CAD 104, selecting a temperature compensating insert material 106, running finite element analysis on the finite element model 108, comparing the results with the design requirements 110, modifying the model and repeating the process until the computed results meet the design requirements 112, determining whether the design can be manufactured at a specified cost 114, verifying the design in step 116 with prototype testing until the design meets the requirements of step 102, and repeating the design process until the design meets a manufacturing cost target 118.

Figure 6:
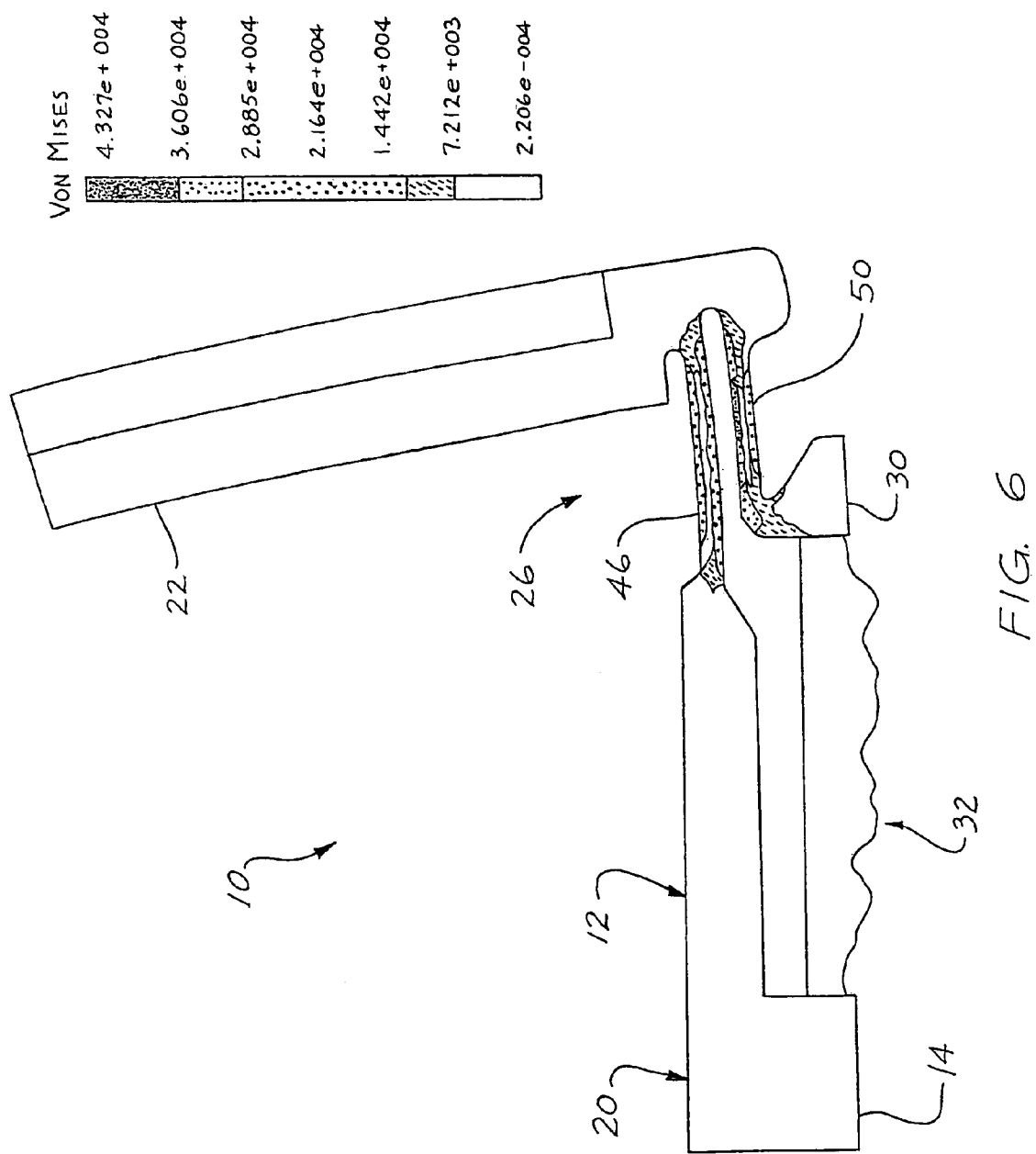
FIG. 6 is a stress analysis graph of one possible construction of the present invention.

Referring now to FIG. 6, an example of finite element analysis results on the apparatus 10 is illustrated. The actuator transmits force through the force transfer member 30 causing peak stress of the apparatus 10 to be localized in the hinge portion 26. The arm portion 22 is deflected from an initial position to a deflected position as a result of the force transfer member 30 imparting force through hinge portions 26 of the apparatus 10. As a result of the illustrated stress distribution using a finite element method, a desired design life of the actuator can be achieved. The stress localized in the hinge areas portions 26, 28 increases as the force of the actuator 32 increases. The apparatus 10 is substantially rigid, and the only bending movement allowed as a result of the force from the actuator is in the hinge portions 26, 28. The hinge portions 26, 28 are designed for infinite life of the apparatus 10 under design load conditions. In other words, the hinge portions 26, 28 have sufficient strength and cross-sections to not yield or fracture during the life of the apparatus 10 as a result of the design and manufacturing methods employed in producing the apparatus 10. An additional finite element analysis is used to examine the motion of the arm portion 22 extending from the hinge portion 26 to the end of the arm portion 22. In this aspect of the analysis, motion of the uncompensated arm is compared to motion of the thermally compensated arm. The motion and forces of both arm types are modeled through the range of normal operating temperatures to ensure effectiveness of the thermal compensation employed and to minimize loss of performance due to undesirable flexing caused by insufficient rigidity. The illustration of FIG. 6 shows the arm portion 22 with greatly exaggerated curvature to graphically signify the thermal compensation analysis.

Referring now to FIG. 7, the actuator 32 is shown preloaded with a compressive force by screw 36. The screw 36 is threadingly engagable with the web 14 of the support structure 12. The screw 36 contacts an adjustment seat 34, such as a rigid force focusing shim, operably engaging the actuator 32. The seat 34 can include a generally curved surface or domed shape for transferring force as a purely compressive force without any shear force component. Actuators made from piezoelectric stacks are not amenable to being placed under tension or side loading. By creating a preload greater than the total displacement of the piezoelectric stack, the stack will always be under compression even while the apparatus is returning to an initial position after discharge of the piezoelectric stack.

Figure 11:
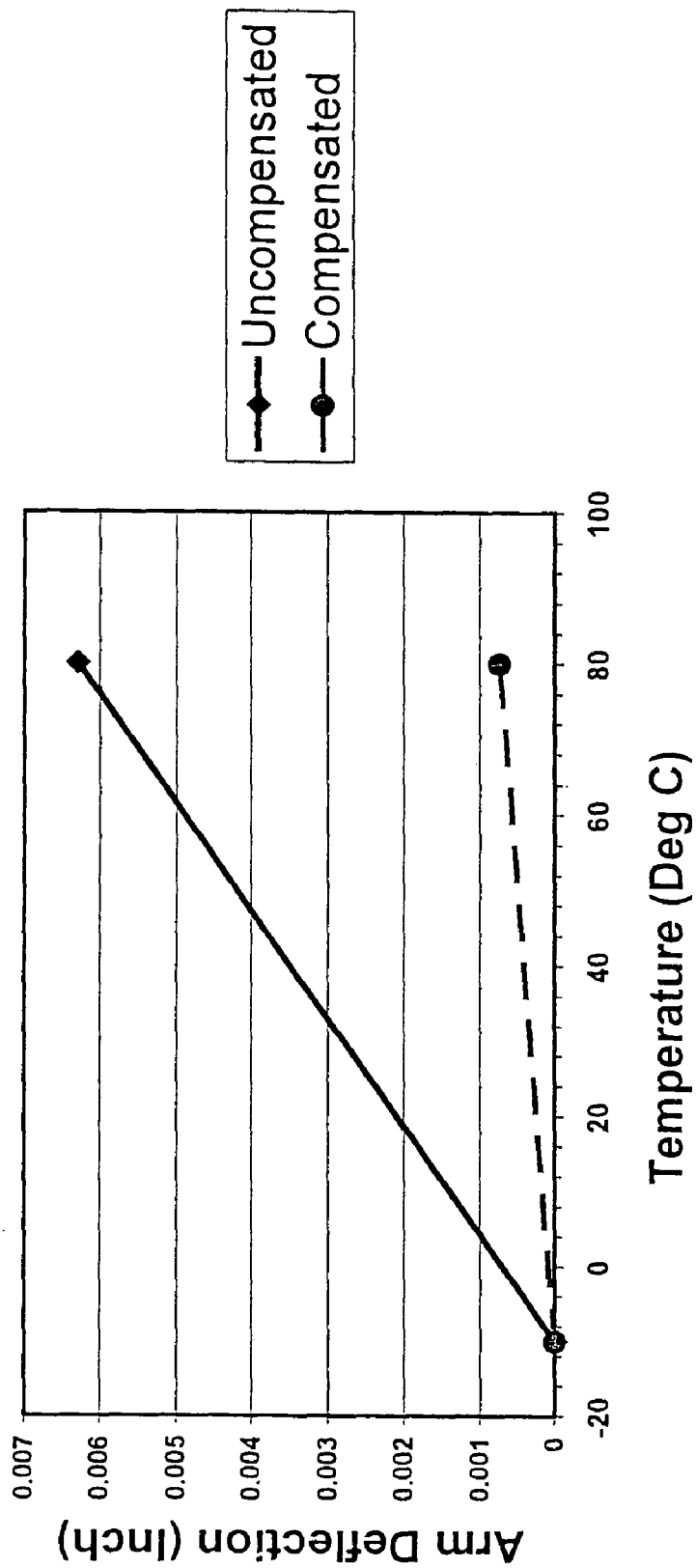
FIG. 11 is a graph illustrating arm displacement in inches versus temperature in Celsius for a temperature compensated arm compared with an uncompensated arm.

In operation, the apparatus 10 will compensate for thermal variations to maintain proportional control of the deflection of the arm portions 22, 24. When the working temperature and/or ambient temperature varies from the design temperature the arm portions are deflected due to variations in the coefficient of thermal expansion between the material of the actuator and the material of the support structure. An experimental example is illustrated in FIG. 11. FIG. 11 illustrates a graph of one possible arm configuration and the arm deflection in inches versus temperature in degrees Celsius for a temperature compensated arm and for an uncompensated arm. The graph shows that the uncompensated arm can deflect over 0.006 of an inch at 80 degrees Celsius, while the temperature compensated arm limits deflection to less than 0.001 of an inch. This is significant since in the tested configuration of the arm, the temperature induced deflection of the uncompensated arm corresponded to approximately 50% of the effective arm displacement of the support structure at a constant temperature in response to electrical actuation of the smart material actuator. In other word, depending on the direction of temperature induced deflection, the illustrated uncompensated arm configuration could be subject to an increase in deflection of approximately 50%, or a loss of deflection of approximately 50%, solely as a result of temperature variation.

Figure 8:
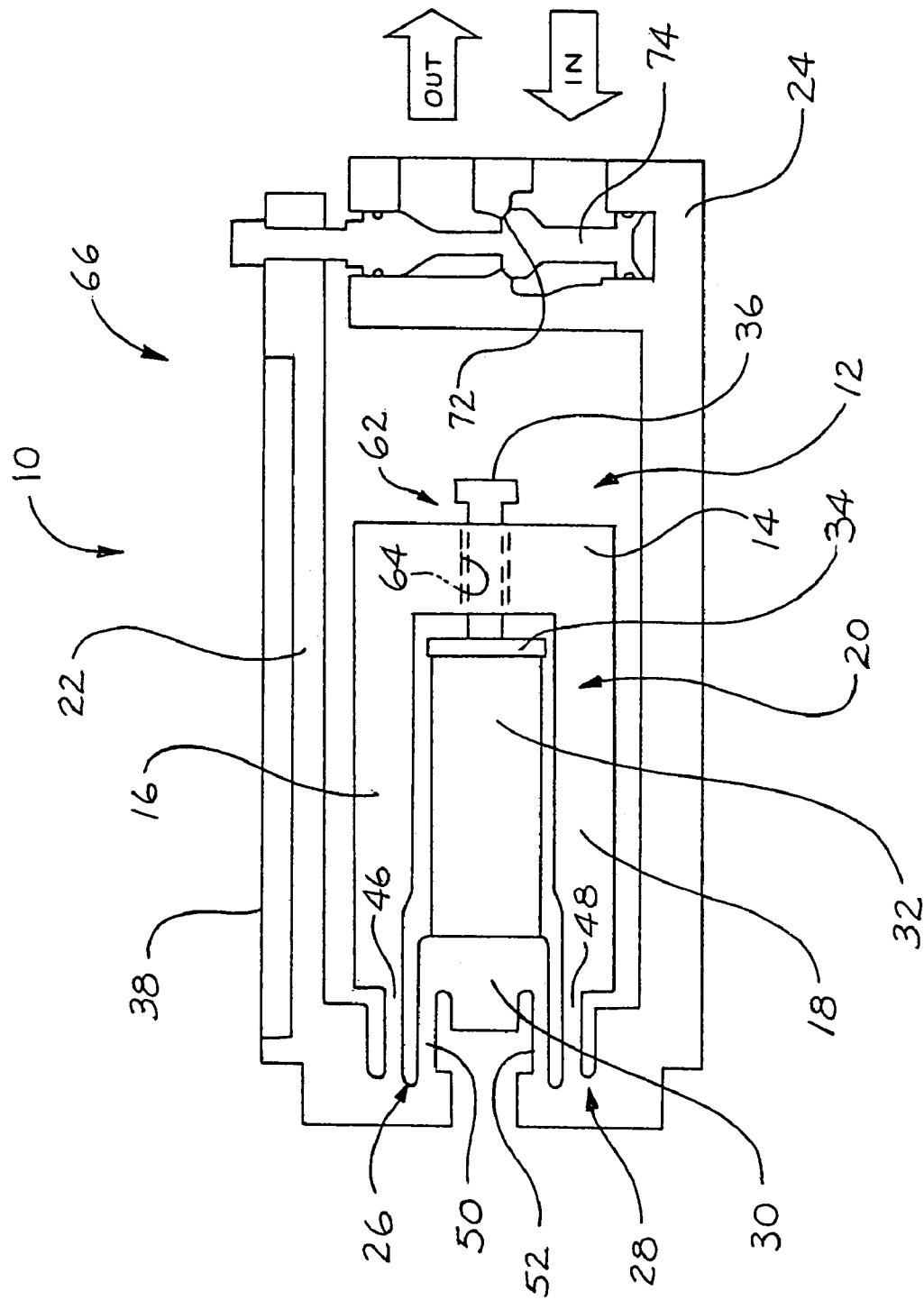
FIG. 8 is a perspective view of an alternate embodiment of the actuator of the present invention with an associated fluidic valve.

Referring now to FIG. 8, a perspective view of the apparatus 10 combined with a fluid valve section 76 having a support structure 12 including a non-flexing web 14 extending between first and second rigid non-flexing side portions 16, 18 forming a C-shaped portion 20. At least one rigid pivotable arm portion 22 can be pivotably connected via a living integral hinge 26. A second rigid pivotable arm portion 24 can be connected via a living integral hinge 28, if two opposing arms are desired. The force transfer member 30 operably engages the smart material actuator 32 in cooperation with the adjustable seat 34. Adjustable seat 34 can be supported by the screw 36 threadably engaged through the support structure 12. Temperature compensating insert 38 is inserted in at least one pivotable arm portion 22. A valve seat 72 can be attached to pivotable arm portion 24. A valve stem 74 can be attached to pivotable arm portion 24. Valve components 72, 74 can form a general purpose proportionally controllable 2-way valve. The valve can be exposed to temperature variations such as within the ambient environment or of the controlled fluid, and the smart material actuator 32 expands and contracts differently from the support structure 12. Pivotable arms 22, 24 can move as a result of the temperature variations causing valve stem 74 to move in relation to valve seat 72. Temperature compensating insert 38 expands or contracts in relation to pivotable arm portion 22, 24 providing compensation for the mismatch in the coefficients of thermal expansion of the smart material actuator 32 and support structure 12. The compensating means 66 according to the present invention prevent the valve stem 74 and valve seat 72 from significant movement in relation to each other as the temperature changes allowing proportional control over a wider range of ambient and operating temperature ranges.

Figure 9:
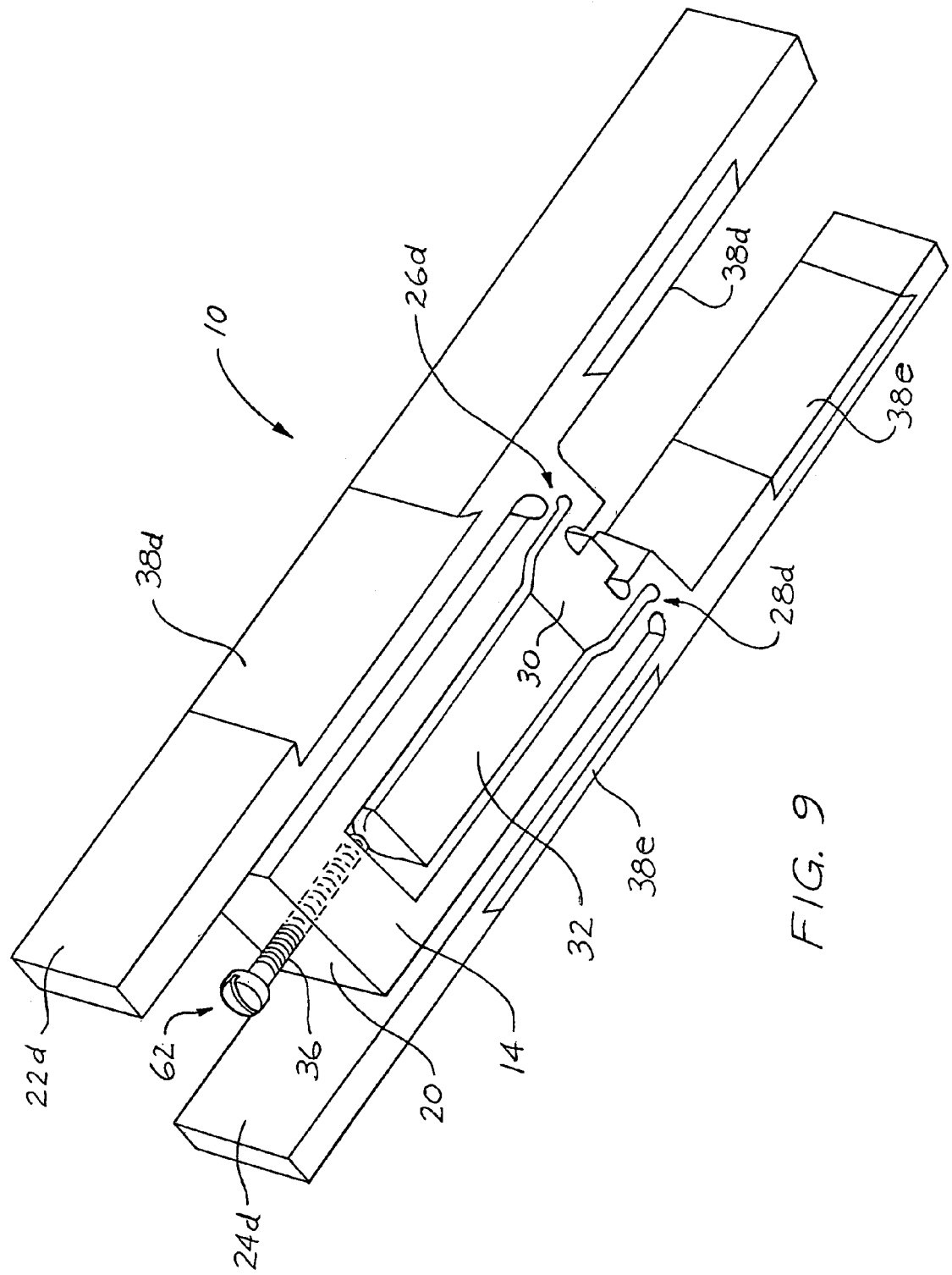
FIG. 9 is a perspective view of an alternate embodiment of the actuator of the present invention.

Referring now to FIG. 9, an actuator 10 is shown with a double acting arm portions 22d, 24d. The arm portions 22d, 24d pivot about hinge portions 26d, 28d as the actuator 32 is actuated. The arm portions 22d, 24d can provide work at opposite ends as the actuator 32 is energized and de-energized. The compensating insert 38d, 38e can be positioned on opposite sides of the arm portions 22d, 28d to counteract the thermal expansion effects resulting from variation in ambient temperature.

While the invention has been described in conjunction with what is presently considered to be the most practical and preferred embodiment, it is to be understood that the invention is not to be limited to the disclosed embodiment but, on the contrary, it is intended to cover various modifications and equivalent arrangements included within the spirit and scope of the appended claims, which scope is to be accorded the broadest interpretation so as to encompass all such modifications and equivalent structures as permitted under law.

What is claimed is:

1. An apparatus comprising:
   a support structure;
   an actuator operably associated with the support structure for proportionally driving the support structure in response to an electrical activation of the actuator; and
   means, interacting with the support structure, for compensating for different coefficients of thermal expansion of materials used in the support structure and the actuator in response to variations in temperature over a predetermined operating temperature range, wherein the temperature compensating means includes bimaterial layers forming at least a portion of the support structure and spaced from the actuator, a first material layer made from a material having a different coefficient of thermal expansion relative to a second material layer such that the bimaterial layers exert a force with respect to the support structure to deflect the support structure in an opposite direction from any deflection caused by a change in ambient temperature.

2. The apparatus of claim 1, wherein the temperature compensating means comprises:
   at least one compensation member operably associated with the support structure and spaced from the actuator, the compensation member made from a material having a different coefficient of thermal expansion relative to the support structure such that the compensation member exerts a force on the support structure in an opposite direction from any deflection force inherent in the support structure caused by a change in ambient temperature.

3. An apparatus comprising:
   a support structure;
   an actuator operably associated with the support structure for proportionally driving the support structure in response to an electrical activation of the actuator; and means, interacting with the support structure, for compensating for different coefficients of thermal expansion of materials used in the support structure and the actuator in response to variations in temperature over a predetermined operating temperature range, wherein the temperature compensating means includes the support structure formed of a first material having a different coefficient of thermal expansion relative to a temperature compensating member formed of a second material such that the two different materials exert opposing forces on one another in response to changes in ambient temperature.

4. The apparatus of claim 3, wherein the opposing forces are sufficient to limit temperature-induced movement of the support structure caused by differences in the coefficients of thermal expansion of the actuator material and the support structure material to no greater than " seven percent of total movement of the support structure.

5. The apparatus of claim 1, wherein the temperature compensating means further comprises a temperature compensating member operably connected with the support structure and spaced from the actuator extending substantially across an entire width of the support structure.

6. The apparatus of claim 1, wherein the temperature compensating means further comprises a temperature compensating member operably connected with the support structure and located on an outer surface of the support structure.

7. An apparatus comprising:
a support structure;
an actuator operably associated with the support structure for proportionally driving the support structure in response to an electrical activation of the actuator; and
means, interacting with the support structure, for compensating for different coefficients of thermal expansion of materials used in the support structure and the actuator in response to variations in temperature over a predetermined operating temperature range, wherein the temperature compensating means includes a temperature compensating member operably connected with the support structure and located on an inner surface of the support structure.

8. An apparatus comprising:
a support structure, wherein the support structure includes at least one arm portion pivotally extending from a side portion through an integrally formed hinge portion located between the side and arm portions;
an actuator operably associated with the support structure for proportionally driving the support structure in response to an electrical activation of the actuator; and
means, interacting with the support structure, for compensating for different coefficients of thermal expansion of materials used in the support structure and the actuator in response to variations in temperature over a predetermined operating temperature range.

9. The apparatus of claim 8, wherein the at least one arm portion folds back over the respective side portion.

10. The apparatus of claim 8, wherein the temperature compensating means comprises:
at least one compensation member operably associated with each arm of the support structure and spaced from the actuator, the compensation member made from a material having a different coefficient of thermal expansion relative to the support structure, such that the compensation member exerts a force on the support structure in an opposite direction from any deflection force inherent in the support structure and actuator caused by a change in ambient temperature.

11. The apparatus of claim 8, wherein the temperature compensating means further comprises:
bimaterial layers forming at least a portion of the at least one arm of the support structure and spaced from the actuator, a first material layer made from a material having a different coefficient of thermal expansion relative to a second material layer such that the bimaterial layers exert a force with respect to the support structure to counteract any deflection caused by a change in ambient temperature.

12. The apparatus of claim 8, wherein the temperature compensating means further comprises:
the at least one arm of the support structure formed of a first material having a different coefficient of thermal expansion relative to a temperature compensating insert associated with the at least one arm and formed of a second material such that the two different materials exert opposing forces on one another in response to changes in ambient temperature.

13. The apparatus of claim 12, wherein the opposing forces are sufficient to limit temperature-induced movement of the at least one arm of the support structure caused by differences in the coefficient of thermal expansion of the actuator material and the support structure material to no greater than " seven percent of total movement of the at least one arm of the support structure.

14. The apparatus of claim 8, wherein the temperature compensating means further comprises a temperature compensating member operably connected with the at least one arm of the support structure and spaced from the actuator extending substantially across an entire width of the at least one arm.

15. The apparatus of claim 8, wherein the temperature compensating means further comprises a temperature compensating member operably connected with the at least one arm of the support structure and located on an outer surface of the at least one arm.

16. The apparatus of claim 8, wherein the temperature compensating means further comprises a temperature compensating member operably connected with the at least one arm of the support structure and located on an inner surface of the at least one arm.

17. An apparatus comprising:
a support structure, wherein the support structure includes at least one arm portion having first and second outwardly extending ends with respect to an integrally formed hinge portion;
an actuator operably associated with the support structure for proportionally driving the support structure in response to an electrical activation of the actuator; and
means, interacting with the support structure, for compensating for different coefficients of thermal expansion of materials used in the support structure and the actuator in response to variations in temperature over a predetermined operating temperature range including at least one temperature compensating member located along each outwardly extending end of the at least one arm.

18. The apparatus of claim 1 further comprising:
means for preloading the actuator with a compressive force.

19. An apparatus comprising:

a support structure;

an actuator operably associated with the support structure for proportionally driving the support structure in response to an electrical activation of the actuator;

means, interacting with the support structure, for compensating for different coefficients of thermal expansion of materials used in the support structure and the actuator in response to variations in temperature over a predetermined operating temperature range; and means for preloading the actuator with a compressive force, wherein the preloading means includes a screw threadably engagable with a threaded aperture formed in a rigid, non-flexing web portion of the support structure, the screw adjustably transmitting a preload force to the actuator.

20. An apparatus comprising:

a support structure;

an actuator operably associated with the support structure for proportionally driving the support structure in response to an electrical activation of the actuator; and means, interacting with the support structure, for compensating for different coefficients of thermal expansion of materials used in the support structure and the actuator in response to variations in temperature over a predetermined operating temperature range;

means for preloading the actuator with a compressive force; and an adjustment seat for focusing a preload force on the actuator, the adjustment seat having a curved surface for distributing the preload force to the actuator as only a compressive force.

* * * * *